(12) United States Patent
Lockwood

(10) Patent No.: US 11,934,291 B2
(45) Date of Patent: Mar. 19, 2024

(54) MEASUREMENT OF PARALLELISM IN MULTICORE PROCESSORS

(71) Applicant: KYOCERA Document Solutions Inc., Osaka (JP)

(72) Inventor: Edwin P Lockwood, Brea, CA (US)

(73) Assignee: KYOCERA Document Solutions Inc., Osaka (JP)

(*) Notice: Subject to any disclaimer, the term of this patent is extended or adjusted under 35 U.S.C. 154(b) by 520 days.

(21) Appl. No.: 17/183,262

(22) Filed: Feb. 23, 2021

(65) Prior Publication Data
US 2022/0269578 A1  Aug. 25, 2022

(51) Int. Cl.
| | |
|---|---|
| G06F 11/34 | (2006.01) |
| G06F 9/451 | (2018.01) |
| G06F 9/48 | (2006.01) |
| G06F 11/30 | (2006.01) |

(52) U.S. Cl.
CPC .......... G06F 11/3476 (2013.01); G06F 9/451 (2018.02); G06F 9/4881 (2013.01); G06F 11/3024 (2013.01)

(58) Field of Classification Search
CPC .. G06F 11/3476; G06F 9/451; G06F 11/3024; G60F 9/4881
See application file for complete search history.

(56) References Cited

U.S. PATENT DOCUMENTS

| | | | |
|---|---|---|---|
| 8,949,414 B2 | 2/2015 | Raja et al. | |
| 9,571,354 B2 | 2/2017 | Annamalaisami et al. | |
| 2015/0025848 A1* | 1/2015 | Fukumoto | G06F 9/5061 |
| | | | 702/186 |
| 2016/0328273 A1* | 11/2016 | Molka | A61B 8/00 |

* cited by examiner

*Primary Examiner* — Wissam Rashid
(74) *Attorney, Agent, or Firm* — GrowIP Law Group LLC

(57) ABSTRACT

A method of logging thread parallelism data include executing a plurality of threads at a multicore processor associated with an operating system to perform symmetrical multiprocessing. The method also includes tracking, at a logging subsystem of the operating system, an accumulated runtime associated with each thread combination of the plurality of threads during execution of the plurality of threads. The accumulated runtime of a particular thread combination increases while the particular thread combination is running on the multicore processor in parallel. The method also include generating, at the logging subsystem, logging data indicating the accumulated runtime for each thread combination. The method further includes outputting the logging data. The logging data is usable to increase thread parallelism at the multicore processor.

20 Claims, 12 Drawing Sheets

700

| Class Index Value (Binary) | Accumulation Index Value | Name | Accumulated Runtime (ms) |
|---|---|---|---|
| 00001 | 1 | Idle Only | 6 |
| 00010 | 2 | Class 1 Only | |
| 00011 | 3 | Class 1 and Idle | |
| 00100 | 4 | Class 2 Only | |
| 00101 | 5 | Class 2 and Idle | |
| 00110 | 6 | Class 2 and Class 1 | 6 |
| 00111 | 7 | Class 2, Class 1, and Idle | |
| 01000 | 8 | Class 3 Only | |
| 01001 | 9 | Class 3 and Idle | |
| 01010 | 10 | Class 3 and Class 1 | |
| 01011 | 11 | Class 3, Class 1, and Idle | 2 |
| 01100 | 12 | Class 3 and Class 2 | |
| 01101 | 13 | Class 3, Class 2, and Idle | 6 |
| 01110 | 14 | Class 3, Class 2, and Class 1 | |
| 01111 | 15 | Class 3, Class 2, Class 1, and Idle | 4 |
| 10000 | 16 | Other Only | |
| 10001 | 17 | Other and Idle | 6 |
| 10010 | 18 | Other and Class 1 | |
| 10011 | 19 | Other, Class 1, and Idle | 6 |
| 10100 | 20 | Other and Class 2 | |
| 10101 | 21 | Other, Class 2, and Idle | |
| 10110 | 22 | Other, Class 2, and Class 1 | 6 |
| 10111 | 23 | Other, Class 2, Class 1, and Idle | |
| 11000 | 24 | Other and Class 3 | |
| 11001 | 25 | Other, Class 3, and Idle | |
| 11010 | 26 | Other, Class 3, and Class 1 | |
| 11011 | 27 | Other, Class 3, Class 1, and Idle | 6 |
| 11100 | 28 | Other, Class 3, and Class 2 | |
| 11101 | 29 | Other, Class 3, Class 2, and Idle | |
| 11110 | 30 | Other, Class 3, Class 2, and Class 1 | 6 |

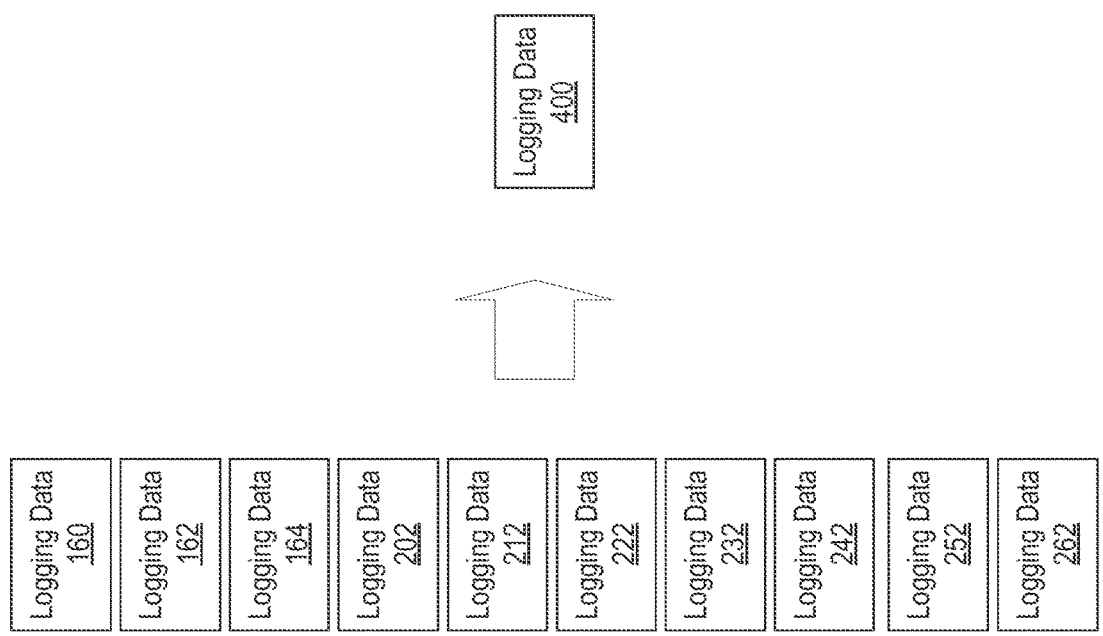

FIG. 5

| Thread | Class | Class Index Value (Binary--Decimal) | First Time Stage 310 | Second Time Stage 320 | Third Time Stage 330 | Fourth Time Stage 340 | Fifth Time Stage 350 | Sixth Time Stage 360 | Seventh Time Stage 370 | Eighth Time Stage 380 | Ninth Time Stage 390 | Tenth Time Stage 395 |
|---|---|---|---|---|---|---|---|---|---|---|---|---|
| Idle | Idle | — | 110B, 110D | 110D | | | | | | 110A, 110C | 110A, 110C-D | 110A-D |
| 152A | Class 1 | 00001b - | 110A | 110A | 110A | 110A | 110A | | | | | |
| 152B | Class 2 | 00010b - | | 110B | 110B | 110B | 110B | 110B | | | | |
| 152C | Class 3 | 00100b - | 110C | 110C | 110C | | | | | | | |
| 152D | Other | 01000b - | | | 110D | | | | | | | |
| 152E | Class 1 | 10000b - 16 | | | | 110C | 110C | | | | | |
| 152F | Class 2 | 00010b - | | | | 110D | 110D | 110D | | | | |
| 152G | Class 3 | 00100b - | | | | | | 110A | 110A | | | |
| 152H | Other (Unclass) | 01000b - | | | | | | | 110B | 110B | 110B | |
| 152I | Class 1 | 10000b - 16 | | | | | | | 110D | 110D | | |
| Accumulation Index Value | | | 11 | 15 | 30 | 22 | 6 | 13 | 27 | 19 | 17 | 1 |

Time Stage Processing Core Assignment

502 — Thread
504 — Class
506 — Class Index Value (Binary--Decimal)

500

| Time Stage With Index Into Accumulation Table | | | | | | | | | |
|---|---|---|---|---|---|---|---|---|---|
| First Time Stage 310 | Second Time Stage 320 | Third Time Stage 330 | Fourth Time Stage 340 | Fifth Time Stage 350 | Sixth Time Stage 360 | Seventh Time Stage 370 | Eighth Time Stage 380 | Ninth Time Stage 390 | Tenth Time Stage 395 |
| 11 | 15 | 30 | 22 | 6 | 13 | 27 | 19 | 17 | 1 |
| 2 | 4 | 6 | 6 | 6 | 6 | 6 | 6 | 6 | 6 |

| | |
|---|---|
| Accumulation Index Value | |
| Time (ms) | |

| Class Index Value (Binary) | Accumulation Index Value | Name | Accumulated Runtime (ms) |
|---|---|---|---|
| 00001 | 1 | Idle Only | 6 |
| 00010 | 2 | Class 1 Only | |
| 00011 | 3 | Class 1 and Idle | |
| 00100 | 4 | Class 2 Only | |
| 00101 | 5 | Class 2 and Idle | |
| 00110 | 6 | Class 2 and Class 1 | 6 |
| 00111 | 7 | Class 2, Class 1, and Idle | |
| 01000 | 8 | Class 3 Only | |
| 01001 | 9 | Class 3 and Idle | |
| 01010 | 10 | Class 3 and Class 1 | |
| 01011 | 11 | Class 3, Class 1, and Idle | 2 |
| 01100 | 12 | Class 3 and Class 2 | |
| 01101 | 13 | Class 3, Class 2, and Idle | 6 |
| 01110 | 14 | Class 3, Class 2, and Class 1 | |
| 01111 | 15 | Class 3, Class 2, Class 1, and Idle | 4 |
| 10000 | 16 | Other Only | |
| 10001 | 17 | Other and Idle | 6 |
| 10010 | 18 | Other and Class 1 | |
| 10011 | 19 | Other, Class 1, and Idle | 6 |
| 10100 | 20 | Other and Class 2 | |
| 10101 | 21 | Other, Class 2, and Idle | |
| 10110 | 22 | Other, Class 2, and Class 1 | 6 |
| 10111 | 23 | Other, Class 2, Class 1, and Idle | |
| 11000 | 24 | Other and Class 3 | |
| 11001 | 25 | Other, Class 3, and Idle | |
| 11010 | 26 | Other, Class 3, and Class 1 | |
| 11011 | 27 | Other, Class 3, Class 1, and Idle | 6 |
| 11100 | 28 | Other, Class 3, and Class 2 | |
| 11101 | 29 | Other, Class 3, Class 2, and Idle | |
| 11110 | 30 | Other, Class 3, Class 2, and Class 1 | 6 |

FIG. 7

| Class Index Value (Binary) | Accumulation Index Value | Name | Accumulated Runtime (ms) |
|---|---|---|---|
| 00001 | 1 | Idle Only | 6 |
| 00110 | 6 | Class 2 and Class 1 | 6 |
| 01011 | 11 | Class 3, Class 1, and Idle | 2 |
| 01101 | 13 | Class 3, Class 2, and Idle | 6 |
| 01111 | 15 | Class 3, Class 2, Class 1, and Idle | 4 |
| 10001 | 17 | Other and Idle | 6 |
| 10011 | 19 | Other, Class 1, and Idle | 6 |
| 10110 | 22 | Other, Class 2, and Class 1 | 6 |
| 11011 | 27 | Other, Class 3, Class 1, and Idle | 6 |
| 11110 | 30 | Other, Class 3, Class 2, and Class 1 | 6 |

MEASUREMENT OF PARALLELISM IN MULTICORE PROCESSORS

BACKGROUND

Software can include multiple threads and processes that are executed in parallel by a processor, such as a multicore processor. Traditionally, an operating system scheduler assigns different threads to be executed by different processing cores of the multicore processor at the same time. To illustrate, at a first time, the operating system scheduler can assign a first thread to be executed by a first processing core of the multicore processor and can assign a second thread to be executed by a second processing core of the multicore processor. A switch can occur at a second time whereby the operating system scheduler assigns a third thread to be executed by the first processing core while the second processing core continues to execute the second thread.

Typically, each switch is logged with timestamps. For example, the operating system can generate and store switching data by logging a timestamp indicating when the first processing core switched from executing the first thread to the third thread. However, because switching can occur at a relatively high frequency, the operating system usually generates a large amount of switching data that is stored in specialized logging equipment. For example, each time a switch occurs, the specialized logging equipment has to store data indicating a timestamp associated with the switch, data indicating which processing core is associated with the switch, and data indicating the threads associated with the switch. As a result, logging the switching data can utilize a relatively large amount of memory.

SUMMARY

In one aspect, a method of logging thread parallelism data includes executing a plurality of threads at a multicore processor associated with an operating system to perform symmetrical multiprocessing. The method also includes tracking, at a logging subsystem of the operating system, an accumulated runtime associated with each thread combination of the plurality of threads during execution of the plurality of threads. The accumulated runtime of a particular thread combination increases while the particular thread combination is running on the multicore processor in parallel. The method also includes generating, at the logging subsystem, logging data indicating the accumulated runtime for each thread combination. The method further includes outputting the logging data. The logging data is usable to increase thread parallelism at the multicore processor.

In a further aspect, a system for logging thread parallelism data includes a multicore processor configured to execute a plurality of threads to perform symmetrical multiprocessing. The system also includes an operating system associated with the multicore processor. The operating system includes a logging subsystem configured to track an accumulated runtime associated with each thread combination of the plurality of threads during execution of the plurality of threads. The accumulated runtime of a particular thread combination increases while the particular thread combination is running on the multicore processor in parallel. The logging subsystem is also configured to generate logging data indicating the accumulated runtime for each thread combination. The system further includes an output device configured to output the logging data. The logging data is usable to increase thread parallelism at the multicore processor.

In a further aspect, a non-transitory computer-readable storage medium includes instructions that, when executed by a multicore processor, cause the multicore processor to perform functions. The functions include executing a plurality of threads to perform symmetrical multiprocessing. The functions also include tracking, at a logging subsystem of an operating system, an accumulated runtime associated with each thread combination of the plurality of threads during execution of the plurality of threads. The accumulated runtime of a particular thread combination increases while the particular thread combination is running on the multicore processor in parallel. The functions further include generating, at the logging subsystem, logging data indicating the accumulated runtime for each thread combination. The functions also include outputting the logging data. The logging data is usable to increase thread parallelism at the multicore processor.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 4 illustrates a process for combining logging data associated with different thread combinations, according to an example embodiment.

FIG. 5 depicts logging data presented in the form of a table, according to an example embodiment.

FIG. 6 depicts logging data presented in the form of another table, according to an example embodiment.

FIG. 7 depicts logging data presented in the form of another table, according to an example embodiment.

FIG. 8 depicts logging data presented in the form of another table, according to an example embodiment.

DETAILED DESCRIPTION

Figure 1:
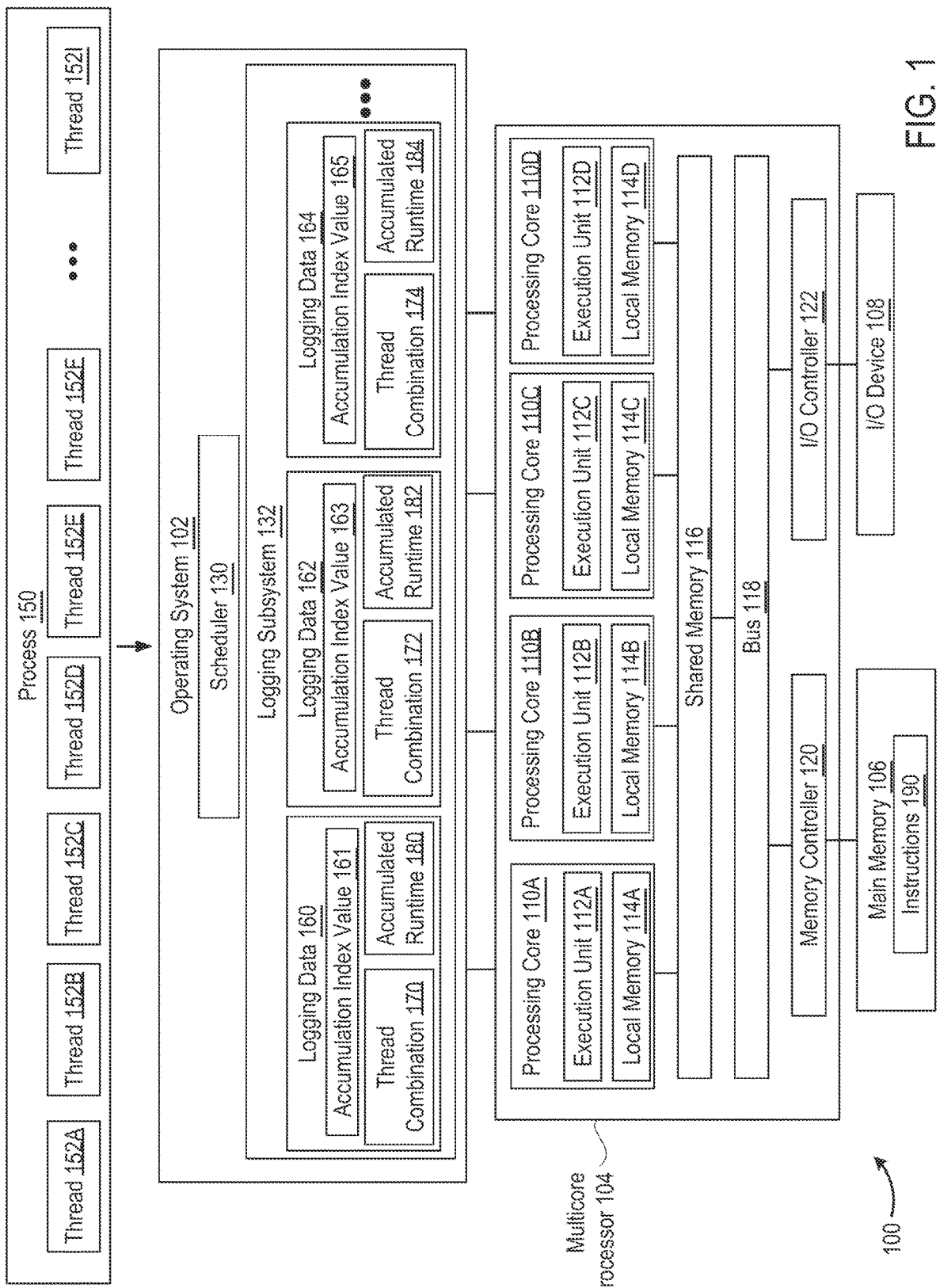
FIG. 1 is a diagram of a system for logging thread parallelism data, according to an example embodiment.

Example methods and systems are described herein. Other example embodiments or features may further be utilized, and other changes may be made, without departing from the scope of the subject matter presented herein. In the following detailed description, reference is made to the accompanying figures, which form a part thereof.

The ordinal terms first, second, and the like in the description and in the claims are used for distinguishing between similar elements and not necessarily for describing a sequence, either temporally, spatially, in ranking, or in any other manner. As such, it is to be understood that the ordinal terms can be interchangeable under appropriate circumstances.

The example embodiments described herein are not meant to be limiting. Thus, aspects of the present disclosure, as generally described herein and illustrated in the figures, can be arranged, substituted, combined, separated, and designed in a wide variety of different configurations, all of which are explicitly contemplated herein.

Particular embodiments are described herein with reference to the figures. In the description, common features are designated by common reference numbers throughout the figures. In some figures, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple threads are illustrated and associated with reference numbers 152A, 152B, 152C, etc. When referring to a particular one of these threads, such as the thread 152A, the distinguishing letter "A" is used. However, when referring to any arbitrary one of these threads or to these threads as a group, the reference number 152 is used without a distinguishing letter.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. OVERVIEW

Illustrative embodiments relate to parallelism measurement systems for a multicore processor and corresponding parallelism measurement methods. An operating system scheduler of a symmetrical multiprocessor (SMP) operating system can schedule threads to be executed in parallel on a multicore processor. A logging subsystem tracks accumulated runtimes that designated thread combinations run on the multicore processor. Based on the tracking, the logging subsystem can generate thread parallelism data (e.g., logging data) that indicates an efficiency of parallel processing.

Thus, the techniques described herein enable collection of thread parallelism data for software performance analysis, specifically with regards to efficient parallelism in systems with low memory. By measuring the times between thread switches by the operating system scheduler and storing the accumulated times in a manner that allows thread parallelism to be instrumented using a small amount of memory, memory can be more efficiently utilized in systems that do not have a large amount of memory. Other benefits will be apparent to those skilled in the art.

II. EXAMPLE SYSTEMS AND METHODS

FIG. 1 depicts a diagram of a system 100 for logging thread parallelism data, according to an example embodiment. As shown, the system 100 includes an operating system 102, a multicore processor 104, a main memory 106, and an input/output (I/O) device 108. According to one implementation, the operating system 102 can be included in an infrastructure layer of the system 100. According to one implementation, the multicore processor 104, the main memory 106, and the I/O device 108 are included in a physical hardware layer of the system 100.

The multicore processor 104 includes a plurality of processing cores 110. For example, the multicore processor 104 includes a processing core 110A, a processing core 110B, a processing core 110C, and a processing core 110D. Although four processing cores 110 are illustrated, in other implementations, the multicore processor 104 can include N processing cores, where N is any integer value that is greater than one. As a non-limiting example, if N is equal to two, the multicore processor 104 can include two processing cores 110. As another non-limiting example, if N is equal to eight, the multicore processor 104 can include eight processing cores 110.

The processing core 110A includes an execution unit 112A and a local memory 114A, the processing core 110B includes an execution unit 112B and a local memory 114B, the processing core 110C includes an execution unit 112C and a local memory 114C, and the processing unit 110D includes an execution unit 112D and a local memory 114D. The execution units 112 can be used to execute instructions within a thread 152 assigned to the respective processing core 110, and the local memories 114 can be used to store data used by the corresponding execution unit 112 of the respective processing core 110. According to some implementations, the local memories 114 are level one (L1) and, occasionally, level two (L2) caches.

The multicore processor 104 also includes a shared memory 116 that is coupled to the processing cores 110. Data stored in the local memories 114 of the processing cores 110 can be fed to the shared memory 116. According to some implementations, the shared memory 116 is a level two (L2) cache or a level three (L3) cache. The multicore processor 104 also includes a memory controller 120 and an I/O controller 122. The memory controller 120 and the I/O controller 122 are coupled to the shared memory 116 via a bus. The memory controller 120 is coupled to access (e.g., read from and write to) the main memory 106, and the I/O controller 122 is coupled to the I/O device 108.

The main memory 106 can be a non-transitory computer-readable storage medium that stores instructions 190. The instructions 190 are executable by the multicore processor 104 to perform the functions described herein.

The operating system 102 includes a scheduler 130 and a logging subsystem 132. A process 150 associated with software is provided to the operating system 102 for task scheduling or execution scheduling. The process 150 includes one or more threads 152 that run in a single address space such that the threads 152 can share memory resources. For example, the process 150 includes a thread 152A, a thread 152B, a thread 152C, a thread 152D, a thread 152E, a thread 152F, a thread 152G (not shown in FIG. 1), a thread 152H (not shown in FIG. 1), and a thread 152I. Although nine threads 152 are illustrated, in other implementations, the process 150 can include K threads 152, where K is any integer greater than one. As a non-limiting example, if K is equal to ten, the process 150 can include ten threads 152 that run in a single address space. As another non-limiting example, if K is equal to twenty, the process 150 can include twenty threads 152 that run in a single address space. Each thread 152 corresponds to a sequence of program instructions that can run independently of other sequences of program instructions (e.g., independently of other threads 152).

Figure 2:
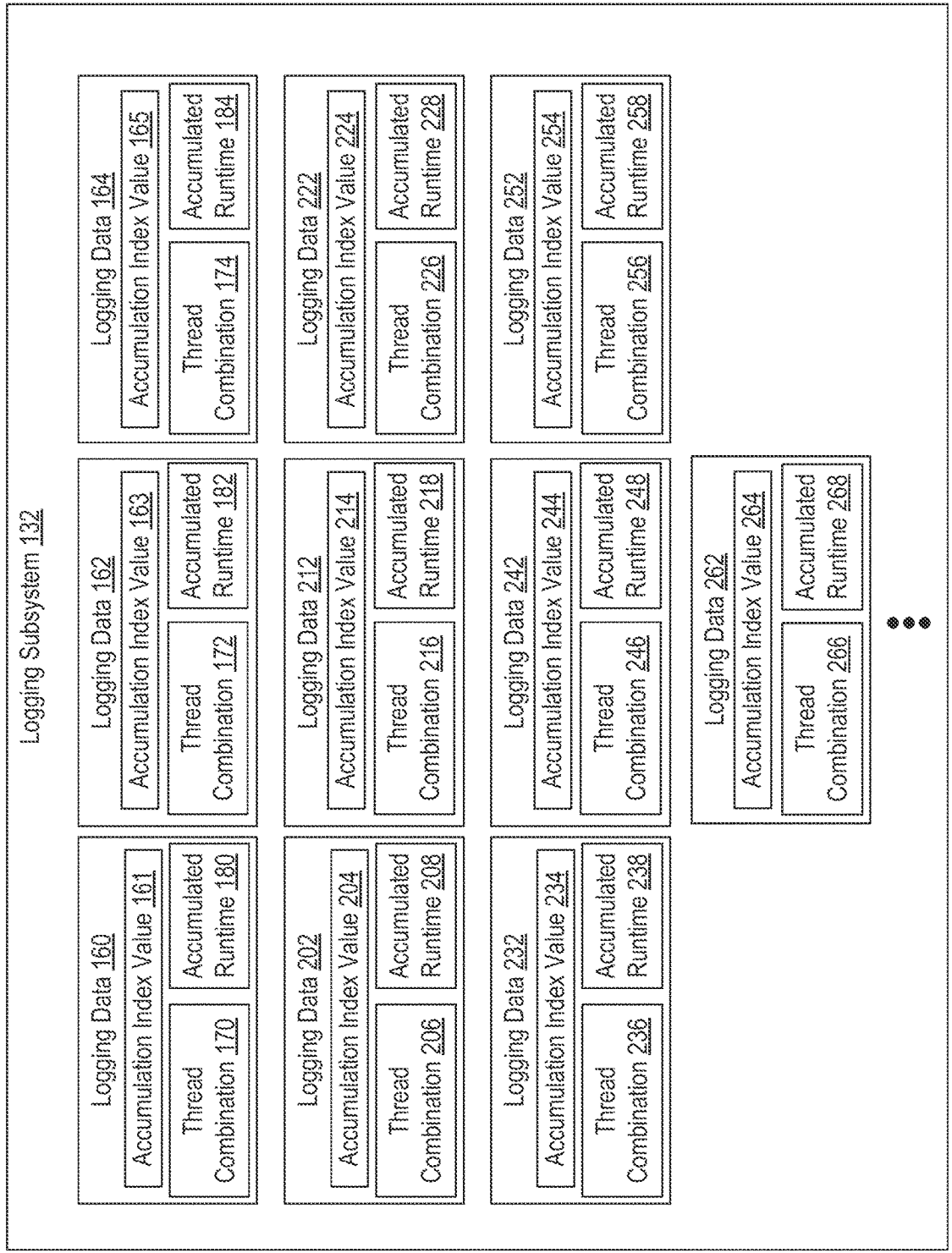
FIG. 2 illustrates a logging subsystem for logging thread parallelism data, according to an example embodiment.

The scheduler 130 of the operating system 102 is configured to schedule different threads 152 to run (e.g., be executed) on the multicore processor 104 for different amounts of time. For example, the scheduler 130 can determine which thread 152 is to be assigned to a processing core 110 for execution during different time periods. The logging subsystem 132 of the operating system 102 is configured to (i) track an accumulated runtime associated with specific combinations of threads 152 that are running on the multicore processor 104 in parallel and (ii) generate logging data based on the tracked accumulated runtimes. Additional logging data generated by the logging subsystem 132 is illustrated in FIG. 2. According to one implementation, operations of the scheduler 130 and the logging subsystem 132 can be implemented using scheduling code and logging code, respectively.

It should be appreciated that tracking the accumulated runtime of specific thread combinations running in parallel utilizes a smaller amount of memory than tracking switches between threads running on the processing cores 110.

The operations of the system 100 are further described with respect to FIGS. 3-12. In particular, the operations of the scheduler 130 and the logging subsystem 132 are described in greater detail with respect to FIGS. 3-12.

Figure 3:
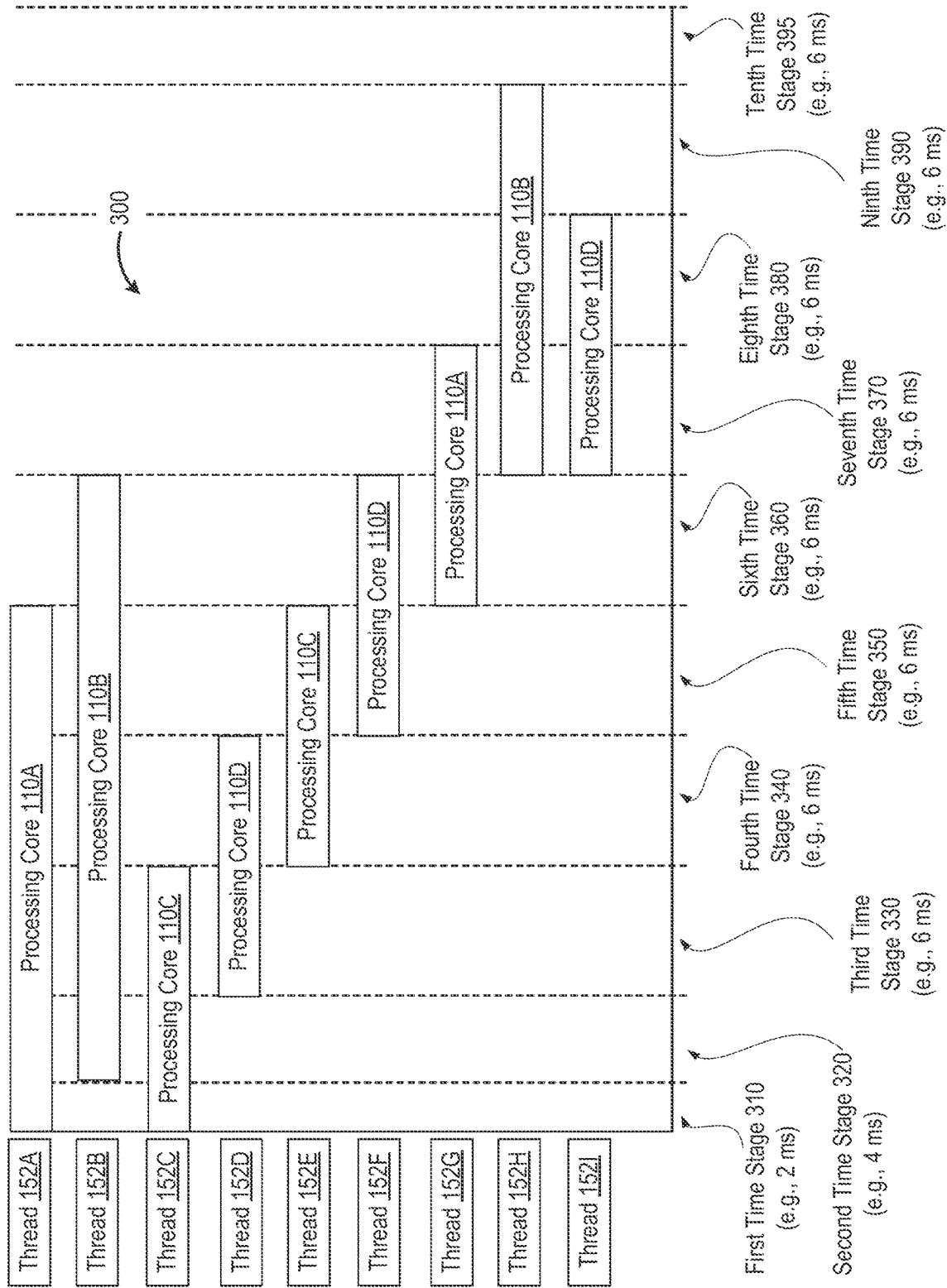
FIG. 3 depicts a diagram illustrating thread parallelism at different time stages, according to an example embodiment.

FIG. 3 depicts a diagram 300 illustrating thread parallelism at different time stages, according to an example embodiment. In particular, the diagram 300 indicates time stages where the scheduler 130 switches the threads 152 running on at least one processing core 110 of the multicore processor 104.

During a first time stage 310, the logging subsystem 132 is configured to identify a group of threads 152A, 152C that are assigned to (e.g., running on) processing cores 110 of the multicore processor 104. For example, according to the illustrative example of FIG. 3, the logging subsystem 132 detects that the thread 152A is running on the processing core 110A and the thread 152C is running on the processing core 110C. The other threads 152 and processing cores 110B, 110D are idle during the first time stage 310. The logging subsystem 132 is configured to assign the group of threads 152A, 152C to an accumulation index value 161 indicative of a specific thread combination 170 running on the multicore processor 104. In this example, the accumulation index value 161 represents the thread combination 170 where the threads 152A, 152C are running on the multicore processor 104 and the other threads 152 are idle.

Additionally, the logging subsystem 132 is configured to determine a time duration of the first time stage 310. To determine the time duration of the first time stage 310, the logging subsystem 132 subtracts a saved system time at the beginning of the first time stage 310 from the system time at the end of the first time stage 310. In the illustrative example of FIG. 3, the time duration of the first time stage 310 is two milliseconds. The logging subsystem 132 is configured to log the time duration of the first time stage 310 under the accumulation index value 161 to generate logging data 160. The logging data 160 indicates an accumulated runtime 180 for the thread combination 170. Thus, after the first time stage 310, the accumulated runtime 180 for the thread combination 170 is two milliseconds.

During a second time stage 320, the logging subsystem 132 is configured to identify a group of threads 152A, 152B, 152C that are assigned to (e.g., running on) processing cores 110 of the multicore processor 104. For example, according to the illustrative example of FIG. 3, the logging subsystem 132 detects that the thread 152A is running on the processing core 110A, the thread 152B is running on the processing core 110B, and the thread 152C is running on the processing core 110C. The other threads 152 are idle during the second time stage 320. The logging subsystem 132 is configured to assign the group of threads 152A, 152B, 152C to an accumulation index value 163 indicative of a specific thread combination 172 running on the multicore processor 104. In this example, the accumulation index value 163 represents the thread combination 172 where the threads 152A, 152B, 152C are running on the multicore processor 104 and the other threads 152 are idle.

Additionally, the logging subsystem 132 is configured to determine a time duration of the second time stage 320. To determine the time duration of the second time stage 320, the logging subsystem 132 subtracts the saved system time at the end of the first time stage 310 from the system time at the end of the second time stage 320. In the illustrative example of FIG. 3, the time duration of the second time stage 320 is four milliseconds. The logging subsystem 132 is configured to log the time duration of the second time stage 320 under the accumulation index value 163 to generate logging data 162. The logging data 162 indicates an accumulated runtime 182 for the thread combination 172. Thus, after the second time stage 320, the accumulated runtime 180 for the thread combination 170 is two milliseconds and the accumulated runtime 182 for the thread combination 172 is four milliseconds.

During a third time stage 330, the logging subsystem 132 is configured to identify a group of threads 152A, 152B, 152C, 152D that are assigned to (e.g., running on) processing cores 110 of the multicore processor 104. For example, according to the illustrative example of FIG. 3, the logging subsystem 132 detects that the thread 152A is running on the processing core 110A, the thread 152B is running on the processing core 110B, the thread 152C is running on the processing core 110C, and the thread 152D is running on the processing core 110D. The other threads 152 are idle during the third time stage 330. The logging subsystem 132 is configured to assign the group of threads 152A, 152B, 152C, 152D to an accumulation index value 165 indicative of a specific thread combination 174 running on the multicore processor 104. In this example, the accumulation index value 165 represents the thread combination 174 where the threads 152A, 152B, 152C, 152D are running on the multicore processor 104 and the other threads 152 are idle.

Additionally, the logging subsystem 132 is configured to determine a time duration of the third time stage 330. To determine the time duration of the third time stage 330, the logging subsystem 132 subtracts the saved system time at the end of the second time stage 320 from the system time at the end of the third time stage 320. In the illustrative example of FIG. 3, the time duration of the third time stage 330 is six milliseconds. The logging subsystem 132 is configured to log the time duration of the third time stage 330 under the accumulation index value 165 to generate logging data 164. The logging data 164 indicates an accumulated runtime 184 for the thread combination 174. Thus, after the third time stage 330, the accumulated runtime 180 for the thread combination 170 is two milliseconds, the accumulated runtime 182 for the thread combination 172 is four milliseconds, and the accumulated runtime 184 for the thread combination 174 is six milliseconds.

During a fourth time stage 340, the logging subsystem 132 is configured to identify a group of threads 152A, 152B, 152D, 152E that are assigned to (e.g., running on) processing cores 110 of the multicore processor 104. For example, according to the illustrative example of FIG. 3, the logging subsystem 132 detects that the thread 152A is running on the processing core 110A, the thread 152B is running on the processing core 110B, the thread 152D is running on the processing core 110D, and the thread 152E is running on the processing core 110C. The other threads 152 are idle during the fourth time stage 340. As illustrated in FIG. 2, the logging subsystem 132 is configured to assign the group of threads 152A, 152B, 152D, 152E to an accumulation index value 204 indicative of a specific thread combination 206 running on the multicore processor 104. In this example, the accumulation index value 204 represents the thread combination 206 where the threads 152A, 152B, 152D, 152E are running on the multicore processor 104 and the other threads 152 are idle.

Additionally, the logging subsystem 132 is configured to determine a time duration of the fourth time stage 340. To determine the time duration of the fourth time stage 340, the logging subsystem 132 subtracts the saved system time at the end of the third time stage 330 from the system time at the end of the fourth time stage 340. In the illustrative example of FIG. 3, the time duration of the fourth time stage 340 is six milliseconds. As illustrated in FIG. 2, the logging subsystem 132 is configured to log the time duration of the fourth time stage 340 under the accumulation index value 204 to generate logging data 202. The logging data 202 indicates an accumulated runtime 208 for the thread combination 206. Thus, after the fourth time stage 340, the accumulated runtime 180 for the thread combination 170 is two milliseconds, the accumulated runtime 182 for the thread combination 172 is four milliseconds, the accumulated runtime 184 for the thread combination 174 is six milliseconds, and the accumulated runtime 208 for the thread combination 206 is six milliseconds.

During a fifth time stage 350, the logging subsystem 132 is configured to identify a group of threads 152A, 152B, 152E, 152F that are assigned to (e.g., running on) processing cores 110 of the multicore processor 104. For example, according to the illustrative example of FIG. 3, the logging subsystem 132 detects that the thread 152A is running on the processing core 110A, the thread 152B is running on the processing core 110B, the thread 152E is running on the processing core 110C, and the thread 152F is running on the processing core 110D. The other threads 152 are idle during the fifth time stage 350. As illustrated in FIG. 2, the logging subsystem 132 is configured to assign the group of threads 152A, 152B, 152E, 152F to an accumulation index value 214 indicative of a specific thread combination 216 running on the multicore processor 104. In this example, the accumulation index value 214 represents the thread combination 216 where the threads 152A, 152B, 152E, 152F are running on the multicore processor 104 and the other threads 152 are idle.

Additionally, the logging subsystem 132 is configured to determine a time duration of the fifth time stage 350. To determine the time duration of the fifth time stage 350, the logging subsystem 132 subtracts the saved system time at the end of the fourth time stage 340 from the system time at the end of the fifth time stage 350. In the illustrative example of FIG. 3, the time duration of the fifth time stage 350 is six milliseconds. As illustrated in FIG. 2, the logging subsystem 132 is configured to log the time duration of the fifth time stage 350 under the accumulation index value 214 to generate logging data 212. The logging data 212 indicates an accumulated runtime 218 for the thread combination 216. Thus, after the fifth time stage 350, the accumulated runtime 180 for the thread combination 170 is two milliseconds, the accumulated runtime 182 for the thread combination 172 is four milliseconds, the accumulated runtime 184 for the thread combination 174 is six milliseconds, the accumulated runtime 208 for the thread combination 206 is six milliseconds, and the accumulated runtime 218 for the thread combination 216 is six milliseconds.

During a sixth time stage 360, the logging subsystem 132 is configured to identify a group of threads 152B, 152F, 152G that are assigned to (e.g., running on) processing cores 110 of the multicore processor 104. For example, according to the illustrative example of FIG. 3, the logging subsystem 132 detects that the thread 152B is running on the processing core 110B, the thread 152F is running on the processing core 110D, and the thread 152G is running on the processing core 110A. The other threads 152 are idle during the sixth time stage 360. As illustrated in FIG. 2, the logging subsystem 132 is configured to assign the group of threads 152B, 152F, 152G to an accumulation index value 224 indicative of a specific thread combination 226 running on the multicore processor 104. In this example, the accumulation index value 224 represents the thread combination 226 where the threads 152B, 152F, 152G are running on the multicore processor 104 and the other threads 152 are idle.

Additionally, the logging subsystem 132 is configured to determine a time duration of the sixth time stage 360. To determine the time duration of the sixth time stage 360, the logging subsystem 132 subtracts the saved system time at the end of the fifth time stage 350 from the system time at the end of the sixth time stage 360. In the illustrative example of FIG. 3, the time duration of the sixth time stage 360 is six milliseconds. As illustrated in FIG. 2, the logging subsystem 132 is configured to log the time duration of the sixth time stage 360 under the accumulation index value 224 to generate logging data 222. The logging data 222 indicates an accumulated runtime 228 for the thread combination 226. Thus, after the sixth time stage 360, the accumulated runtime 180 for the thread combination 170 is two milliseconds, the accumulated runtime 182 for the thread combination 172 is four milliseconds, the accumulated runtime 184 for the thread combination 174 is six milliseconds, the accumulated runtime 208 for the thread combination 206 is six milliseconds, the accumulated runtime 218 for the thread combination 216 is six milliseconds, and the accumulated runtime 228 for the thread combination 226 is six milliseconds.

During a seventh time stage 370, the logging subsystem 132 is configured to identify a group of threads 152G, 152H, 152I that are assigned to (e.g., running on) processing cores 110 of the multicore processor 104. For example, according to the illustrative example of FIG. 3, the logging subsystem 132 detects that the thread 152G is running on the processing core 110A, the thread 152H is running on the processing core 110B, and the thread 152I is running on the processing core 110D. The other threads 152 are idle during the seventh time stage 370. As illustrated in FIG. 2, the logging subsystem 132 is configured to assign the group of threads 152G, 152H, 152I to an accumulation index value 234 indicative of a specific thread combination 236 running on the multicore processor 104. In this example, the accumulation index value 234 represents the thread combination 236 where the threads 152G, 152H, 152I are running on the multicore processor 104 and the other threads 152 are idle.

Additionally, the logging subsystem 132 is configured to determine a time duration of the seventh time stage 370. To determine the time duration of the seventh time stage 370, the logging subsystem 132 subtracts the saved system time at the end of the sixth time stage 360 from the system time at the end of the seventh time stage 370. In the illustrative example of FIG. 3, the time duration of the seventh time stage 370 is six milliseconds. As illustrated in FIG. 2, the logging subsystem 132 is configured to log the time duration of the seventh time stage 370 under the accumulation index value 234 to generate logging data 232. The logging data 232 indicates an accumulated runtime 238 for the thread combination 236. Thus, after the seventh time stage 370, the accumulated runtime 180 for the thread combination 170 is two milliseconds, the accumulated runtime 182 for the thread combination 172 is four milliseconds, the accumulated runtime 184 for the thread combination 174 is six milliseconds, the accumulated runtime 208 for the thread combination 206 is six milliseconds, the accumulated runtime 218 for the thread combination 216 is six milliseconds, the accumulated runtime 228 for the thread combination 226 is six milliseconds, and the accumulated runtime 238 for the thread combination 236 is six milliseconds.

During an eighth time stage 380, the logging subsystem 132 is configured to identify a group of threads 152H, 152I that are assigned to (e.g., running on) processing cores 110 of the multicore processor 104. For example, according to the illustrative example of FIG. 3, the logging subsystem 132 detects that the thread 152H is running on the processing core 110B and the thread 152I is running on the processing core 110D. The other threads 152 are idle during the eighth time stage 380. As illustrated in FIG. 2, the logging subsystem 132 is configured to assign the group of threads 152H, 152I to an accumulation index value 244 indicative of a specific thread combination 246 running on the multicore processor 104. In this example, the accumulation index value 244 represents the thread combination 246 where the threads 152H, 152I are running on the multicore processor 104 and the other threads 152 are idle.

Additionally, the logging subsystem 132 is configured to determine a time duration of the eighth time stage 380. To determine the time duration of the eighth time stage 380, the logging subsystem 132 subtracts the saved system time at the end of the seventh time stage 370 from the system time at the end of the eighth time stage 380. In the illustrative example of FIG. 3, the time duration of the eighth time stage 380 is six milliseconds. As illustrated in FIG. 2, the logging subsystem 132 is configured to log the time duration of the eighth time stage 380 under the accumulation index value 244 to generate logging data 242. The logging data 242 indicates an accumulated runtime 248 for the thread combination 246. Thus, after the eighth time stage 380, the accumulated runtime 180 for the thread combination 170 is two milliseconds, the accumulated runtime 182 for the thread combination 172 is four milliseconds, the accumulated runtime 184 for the thread combination 174 is six milliseconds, the accumulated runtime 208 for the thread combination 206 is six milliseconds, the accumulated runtime 218 for the thread combination 216 is six milliseconds, the accumulated runtime 228 for the thread combination 226 is six milliseconds, the accumulated runtime 238 for the thread combination 236 is six milliseconds, and the accumulated runtime 248 for the thread combination 246 is six milliseconds.

During a ninth time stage 390, the logging subsystem 132 is configured to identify the thread 152H that is assigned to (e.g., running on) processing cores 110 of the multicore processor 104. For example, according to the illustrative example of FIG. 3, the logging subsystem 132 detects that the thread 152H is running on the processing core 110B. The other threads 152 are idle during the ninth time stage 390. As illustrated in FIG. 2, the logging subsystem 132 is configured to assign the thread 152H to an accumulation index value 254 indicative of a specific thread combination 256 running on the multicore processor 104. In this example, the accumulation index value 104 represents the thread combination 256 where the thread 152H is running on the multicore processor 104 and the other threads 152 are idle.

Additionally, the logging subsystem 132 is configured to determine a time duration of the ninth time stage 390. To determine the time duration of the ninth time stage 390, the logging subsystem 132 subtracts the saved system time at the end of the eighth time stage 380 from the system time at the end of the ninth time stage 390. In the illustrative example of FIG. 3, the time duration of the ninth time stage 390 is six milliseconds. As illustrated in FIG. 2, the logging subsystem 132 is configured to log the time duration of the ninth time stage 390 under the accumulation index value 254 to generate logging data 252. The logging data 252 indicates an accumulated runtime 258 for the thread combination 256. Thus, after the ninth time stage 390, the accumulated runtime 180 for the thread combination 170 is two milliseconds, the accumulated runtime 182 for the thread combination 172 is four milliseconds, the accumulated runtime 184 for the thread combination 174 is six milliseconds, the accumulated runtime 208 for the thread combination 206 is six milliseconds, the accumulated runtime 218 for the thread combination 216 is six milliseconds, the accumulated runtime 228 for the thread combination 226 is six milliseconds, the accumulated runtime 238 for the thread combination 236 is six milliseconds, the accumulated runtime 248 for the thread combination 246 is six milliseconds, and the accumulated runtime 258 for the thread combination 256 is six milliseconds.

During a tenth time stage 395, the logging subsystem 132 is configured to identify that all threads 152 are idle. As illustrated in FIG. 2, the logging subsystem 132 is configured to assign this scenario to an accumulation index value 264 indicative of a thread combination 256 where all threads 152 are idle.

Additionally, the logging subsystem 132 is configured to determine a time duration of the tenth time stage 395. To determine the time duration of the tenth time stage 395, the logging subsystem 132 subtracts the saved system time at the end of the ninth time stage 390 from the system time at the end of the tenth time stage 395. In the illustrative example of FIG. 3, the time duration of the tenth time stage 395 is six milliseconds. As illustrated in FIG. 2, the logging subsystem 132 is configured to log the time duration of the tenth time stage 395 under the accumulation index value 264 to generate logging data 262. The logging data 262 indicates an accumulated runtime 268 for the thread combination 266. Thus, after the tenth time stage 395, the accumulated runtime 180 for the thread combination 170 is two milliseconds, the accumulated runtime 182 for the thread combination 172 is four milliseconds, the accumulated runtime 184 for the thread combination 174 is six milliseconds, the accumulated runtime 208 for the thread combination 206 is six milliseconds, the accumulated runtime 218 for the thread combination 216 is six milliseconds, the accumulated runtime 228 for the thread combination 226 is six milliseconds, the accumulated runtime 238 for the thread combination 236 is six milliseconds, the accumulated runtime 248 for the thread combination 246 is six milliseconds, the accumulated runtime 258 for the thread combination 256 is six milliseconds, and the accumulated runtime 268 for the thread combination 266 is six milliseconds.

Thus, using the techniques described with respect to FIGS. 1-3, the logging subsystem 132 measures the times between thread switches by the scheduler 130 and stores the measured times in such a manner that enables thread parallelism to be instrumented using a small amount of memory.

FIG. 4 illustrates a process for combining logging data associated with different thread combinations, according to an example embodiment. According to the process illustrated in FIG. 4, the logging subsystem 132 is configured to combine the logging data for each accumulation index value (or thread combination) to generate logging data 400. The logging subsystem 132 can output the logging data 400 in various forms, as described with respect to FIGS. 5-9. As described with respect to FIG. 10, the logging data 400 can be usable to increase thread parallelism at the multicore processor 104 by adjusting scheduling operations.

The logging data 400 enables thread parallelism to be tracked or measured using a reduced amount of memory. For example, because the logging data 400 stores the accumulated runtime for different thread combinations as opposed to storing data intensive information associated with switching between threads and processing cores, the logging data 400 utilizes a small amount of memory compared to traditional data used to track thread parallelism.

FIG. 5 depicts the logging data 400 presented in the form of a table 500, according to an example embodiment. The operating system 102 and/or the logging subsystem 132 can populate the table 500 using the logging data 400 of FIG. 4. The table 500 indicates activity of the processing cores 110 and classification of the threads 152. According to one implementation, the table 500 can be provided as an output for monitoring thread parallelism at the multicore processor 104.

The table 500 includes a thread column 502, a class column 504, and a class index value column 506. The thread column 502 lists each thread 152A-152I, as well as idle threads, in which perhaps no threads are running on the multicore processor 104. The class column 504 identifies threads 152 as a "Class 1" thread, a "Class 2" thread, a "Class 3" thread, an unclassified (e.g., "Other") thread, or an "Idle" thread. Each class (other than "Idle") can represent a different stage in a printing process, for example. Thus, according to one example, a "Class 1" thread can correspond to an interpretation stage in a printing process, a "Class 2" thread can correspond to an intermediate stage in the printing process, and a "Class 3" thread can correspond to an order generation stage in the printing process. To increase efficiency and parallelism, it would be beneficial to have a thread associated with each class running on the multicore processor 104 in parallel. According to the table 500, the threads 152A, 152E, 152I are classified as "Class 1" threads, the threads 152B, 152F are classified as "Class 2" threads, the threads 152C, 152G are classified as "Class 3" threads, and threads 152D, 152H are unclassified threads. It should be understood that the classifications are merely for illustrative purposes and should not be construed as limiting.

The class index value column 506 identifies a binary class index value and a decimal class index value for each class, including the "Idle" class. According to the table 500, "Idle" threads have a binary class index value of "00001" and a decimal class index value of "1", "Class 1" threads have a binary class index value of "00010" and a decimal class index value of "2", "Class 2" threads have a binary class index value of "00100" and a decimal class index value of "4", "Class 3" threads have a binary class index value of "01000" and a decimal class index value of "8", and unclassified ("Other") threads have a binary class index value of "10000" and decimal class index value of "16".

The table 500 also indicates activity of the processing cores 110 during each time stage, as described above with respect to FIG. 3. For example, during the first time stage 310, the processing cores 110B, 110D are idle, the processing core 110A executes the thread 152A, and the processing core 110C executes the thread 152C. During the second time stage 320, the processing core 110D is idle, the processing core 110A executes the thread 152A, the processing core 110B executes the thread 152B, and the processing core 110C executes the thread 152C. During the third time stage 330, the processing core 110A executes the thread 152A, the processing core 110B executes the thread 152B, the processing core 110C executes the thread 152C, and the processing core 110D executes the thread 152D. In a similar manner, the columns associated with other time stages indicate the activity of each processing core 110 of the multicore processor 104.

The table 500 also indicates the accumulation index values for each thread combination during a specific time stage. For example, the table 500 indicates the accumulation index value 161 of "11" for the thread combination 170 (e.g., the threads 152A, 152C) that is running on processing cores 110 during the first time stage 310, the accumulation index value 163 of "15" for the thread combination 172 (3.g., the threads 152A, 152B, 152C) that is running on processing cores 110 during the second time stage 320, etc.

FIG. 6 depicts the logging data 400 presented in the form of another table 600, according to an example embodiment. The operating system 102 and/or the logging subsystem 132 can populate the table 600 using the logging data 400 of FIG. 4. The table 600 indicates accumulation runtimes for each thread combination. According to one implementation, the table 600 can be provided as an output for monitoring thread parallelism at the multicore processor 104.

According to the table 600, the thread combination 170 associated with the accumulation index value 161 of "11" has an accumulated runtime 180 of two milliseconds based on processing activity during the first time stage 310, the thread combination 172 associated with the accumulation index value 163 of "15" has an accumulated runtime 182 of four milliseconds based on processing activity during the second time stage 320, the thread combination 174 associated with the accumulation index value 165 of "30" has an accumulated runtime 184 of six milliseconds based on processing activity during the third time stage 330, etc.

FIG. 7 depicts the logging data 400 presented in the form of another table 700, according to an example embodiment. The operating system 102 and/or the logging subsystem 132 can populate the table 700 using the logging data 400 of FIG. 4. The table 700 indicates accumulation runtimes for each thread combination according to class. According to one implementation, the table 700 can be provided as an output for monitoring thread parallelism at the multicore processor 104.

According to the table 700, each row indicates an accumulated runtime that a corresponding class combination is running on the multicore processor 104 in parallel. Each row can be identified by a corresponding accumulation index value or by a corresponding binary class index value. For example, the first row of the table 700 can be identified by the accumulation index value "1" or the binary class index value "00001." As another example, the twentieth row of the table 700 can be identified by the accumulation index value "20" or the binary class index value "10100."

According to the first row of the table 700, the multicore processor 104 is idle for six milliseconds. The first row corresponds to the tenth time stage 395 whereby there are no threads 152 running on the processing cores 110. According to the sixth row of the table 700, the multicore processor 104 runs "Class 2" threads and "Class 1" threads for six milliseconds. The sixth row corresponds to the fifth time stage 350 whereby the "Class 2" threads 152B, 152F are running on the processing cores 110B, 110D, respectively, and whereby the "Class 1" threads 152A, 152E are running on the processing cores 110A, 11C, respectively. According to the eleventh row of the table 700, the multicore processor 104 runs "Class 3" threads, "Class 1" threads, and has at least one processing core 110 that is idle for two milliseconds. The eleventh row corresponds to the first time stage 350 whereby the "Class 3" thread 152C is running on the processing core 110C, the "Class 1" thread 152A is running on the processing core 110A, and the processing cores 110B, 110D are idle.

According to the thirteenth row of the table 700, the multicore processor 104 runs "Class 3" threads, "Class 2" threads, and has at least one processing core 110 that is idle for six milliseconds. The thirteenth row of the table 700 corresponds to the sixth time stage 360 whereby the "Class 3" thread 152G is running on the processing core 110A, the "Class 2" threads 152B, 152F are running on the processing cores 110B, 110D, respectively, and the processing core 110C is idle. According to the fifteenth row of the table 700, the multicore processor 104 runs "Class 3" threads, "Class 2" threads, "Class 1" threads, and has at least one processing core 110 that is idle for four milliseconds. The fifteenth row of the table 700 corresponds to second time stage 320 whereby the "Class 3" thread 152C is running on the processing core 110C, the "Class 2" thread 152B is running on the processing core 110B, the "Class 1" thread 152A is running on the processing core 110A, and the processing core 110D is idle. According to the seventeenth row of the table 700, the multicore processor 104 runs an unclassified thread and has at least one processing core 110 that is idle for six milliseconds. The seventeenth row of the table 700 corresponds to the ninth time stage 390 whereby the unclassified thread 152H is running on the processing core 110B and the processing cores 110A, 110C, 110D are idle.

According to the nineteenth row of the table 700, the multicore processor 104 runs an unclassified thread, "Class 1" threads, and has at least one processing core 110 that is idle for six milliseconds. The nineteenth row of the table 700 corresponds to the eighth time stage 380 whereby the unclassified thread 152H is running on the processing core 110B, the "Class 1" thread 152I is running on the processing core 110D, and the processing cores 110A, 110C are idle. According to the twenty-second row of the table 700, the multicore processor 104 runs an unclassified thread, "Class 2" threads, and "Class 1" threads for six milliseconds. The twenty-second row of the table 700 corresponds to the fourth time stage 340 whereby the unclassified thread 152D is running on the processing core 110D, the "Class 2" thread 152B is running on the processing core 110B, and the "Class 1" threads 152A, 152E are running on the processing cores 110A, 110C, respectively.

According to the twenty-seventh row of the table 700, the multicore processor 104 runs an unclassified thread, "Class 3" threads, "Class 1" threads, and has at least one processing core 110 that is idle for six milliseconds. The twenty-seventh row of the table 700 corresponds to the seventh time stage 370 whereby the unclassified thread 152H is running on the processing core 110B, the "Class 3" thread 152G is running on the processing core 110A, the "Class 1" thread 152I is running on the processing core 110C, and the processing core 110C is idle. According to the thirtieth row of the table 700, the multicore processor 104 runs an unclassified thread, "Class 3" threads, "Class 2" threads, and "Class 1" threads for six milliseconds. The thirtieth row of the table 700 corresponds to the third time stage 330 whereby the unclassified thread 152D is running on the processing core 110D, the "Class 3" thread 152C is running on the processing core 110C, the "Class 2" thread 152B is running on the processing core 110B, and the "Class 1" thread 152A is running on the processing core 110A.

The other rows in the table 700 reflect class combinations that are not undergone in parallel at the multicore processor 104. For example, the class combinations reflected in rows two through five, rows seven through ten, row twelve, row fourteen, row sixteen, row eighteen, rows twenty-one and twenty-two, rows twenty-three through twenty-six, and rows twenty-eight and twenty-nine are not undergone in parallel at the multicore processor 104.

FIG. 8 depicts the logging data 400 presented in the form of another table 800, according to an example embodiment. The operating system 102 and/or the logging subsystem 132 can populate the table 800 using the logging data 400 of FIG. 4. The table 800 indicates accumulation runtimes for thread combinations undergone in parallel at the multicore processor 104 according to class. According to one implementation, the table 800 can be provided as an output for monitoring thread parallelism at the multicore processor 104.

The table 800 is a condensed version of the table 700 in FIG. 7. For example, the table 800 includes the rows in the table 700 that reflect class combinations undergone in parallel at the multicore processor 104. However, the table 800 excludes the rows in the table 700 that reflect class combinations that are not undergone in parallel at the multicore processor 104.

Figure 9:
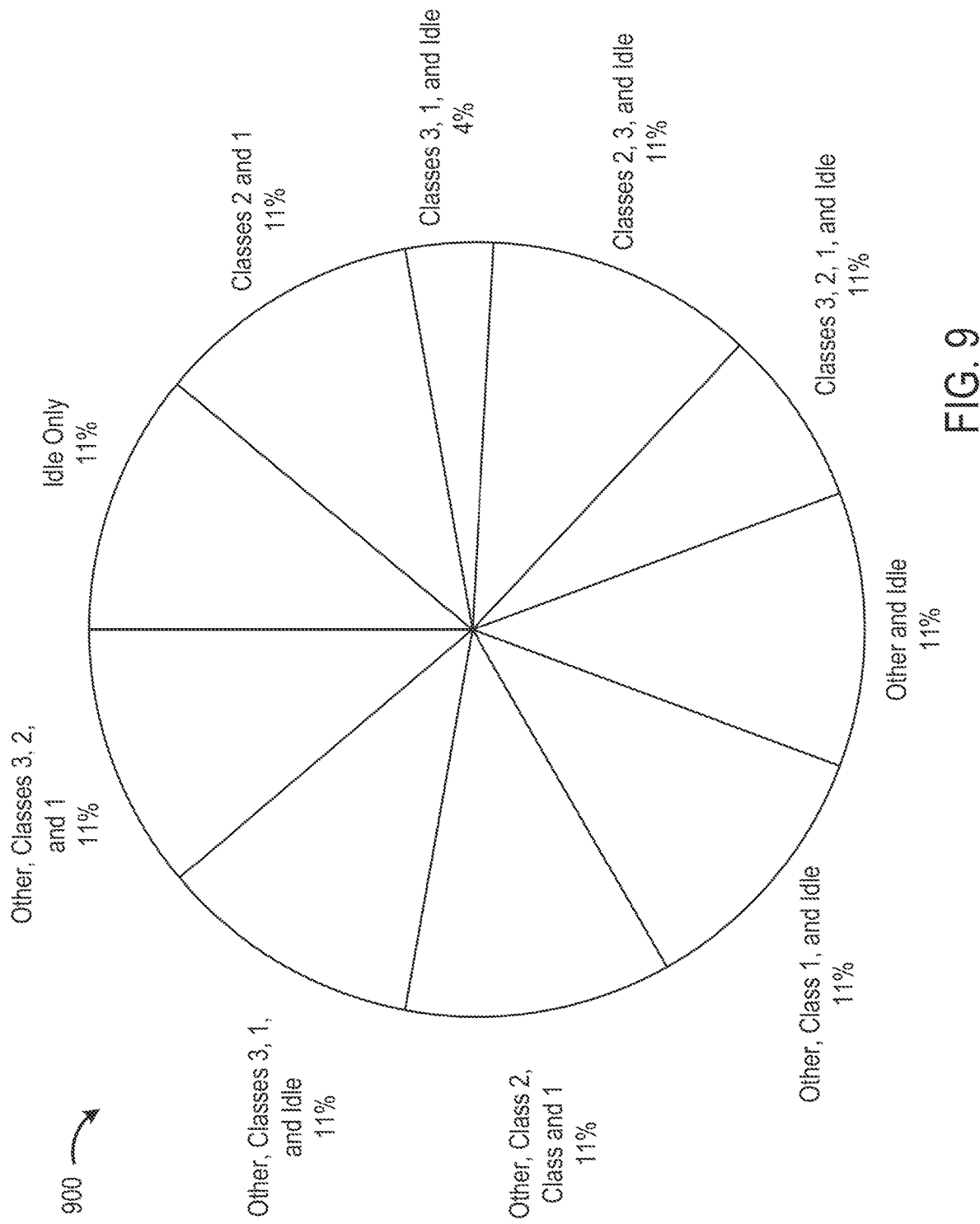
FIG. 9 depicts logging data presented in the form of a pie chart, according to an example embodiment.

FIG. 9 depicts the logging data 400 presented in the form of a chart 900, according to an example embodiment. The operating system 102 and/or the logging subsystem 132 can generate the chart 900 using the logging data 400 of FIG. 4. The chart 900 indicates time percentage that each class combination is running at the multicore processor 104 according to class. According to one implementation, the chart 900 can be provided as an output for monitoring thread parallelism at the multicore processor 104.

According to the chart 900, "Class 2" threads and "Class 1" threads are exclusively running in parallel at the multicore processor 104 eleven percent of the time. According to the chart 900, "Class 3" threads and "Class 1" threads are exclusively running in parallel at the multicore processor 104 with at least one idle processing core four percent of the time. According to the chart 900, "Class 3" threads and "Class 2" threads are exclusively running in parallel at the multicore processor 104 with at least one idle processing core 110 eleven percent of the time.

According to the chart 900, "Class 3" threads, "Class 2" threads, and "Class 1" threads are exclusively running in parallel at the multicore processor 104 with at least one idle processing core 110 eleven percent of the time. According to the chart 900, unclassified threads are exclusively running at the multicore processor 104 with at least one idle processing core 110 eleven percent of the time. According to the chart 900, unclassified threads and "Class 1" threads are exclusively running at the multicore processor 104 with at least one idle processing core 110 eleven percent of the time. According to the chart 900, unclassified threads, "Class 2" threads, and "Class 1" threads are exclusively running at the multicore processor 104 with at least one idle processing core 110 eleven percent of the time.

According to the chart 900, unclassified threads, "Class 3" threads, and "Class 1" threads are exclusively running at the multicore processor 104 with at least one idle processing core 110 eleven percent of the time. According to the chart 900, unclassified threads, "Class 3" threads, "Class 2" threads, and "Class 1" threads are exclusively running at the multicore processor 104 with at least one idle processing core 110 eleven percent of the time. According to the chart 900, the processing cores 110 are idle eleven percent of the time.

Figure 10:
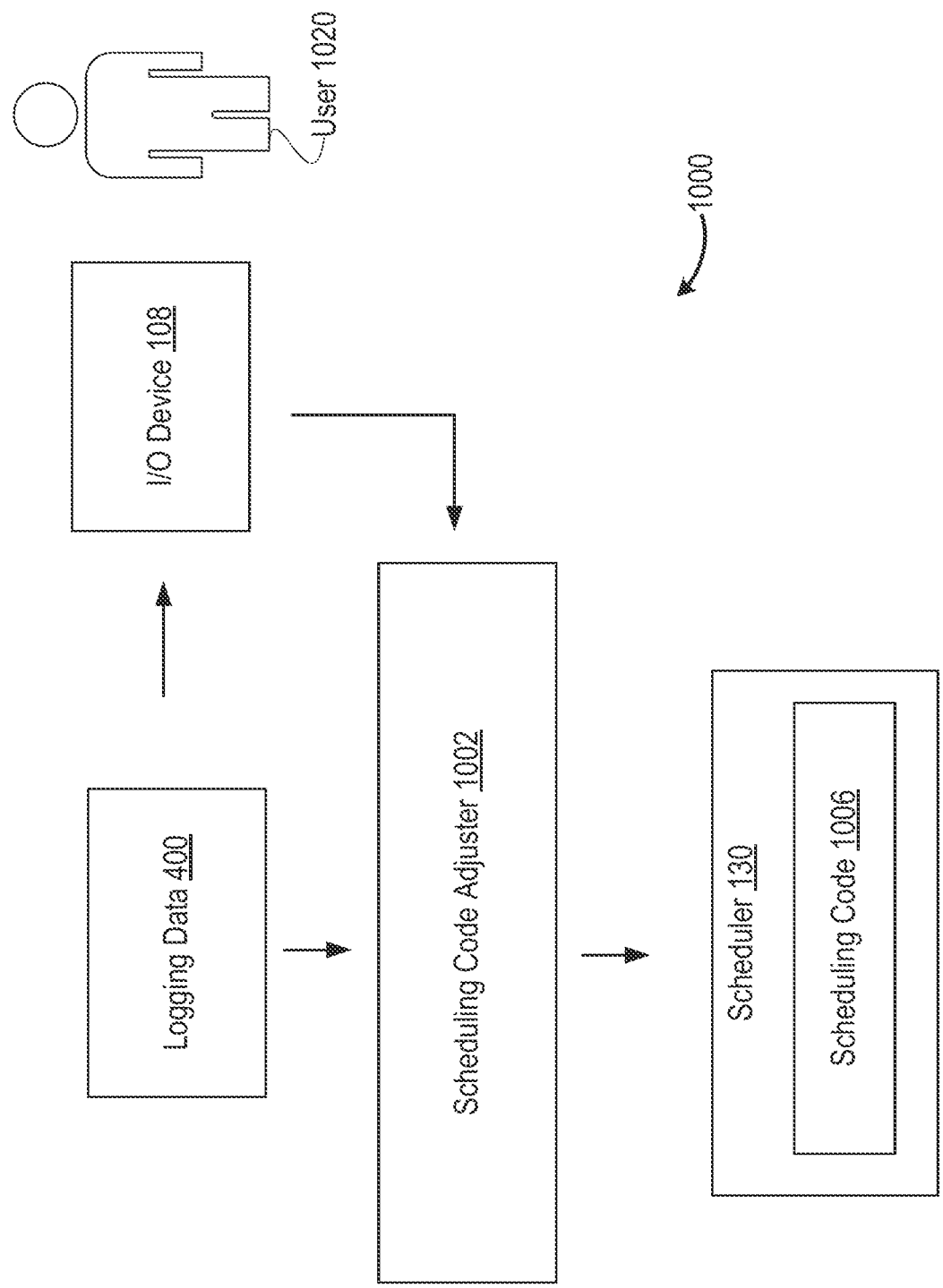
FIG. 10 is a diagram of a system for adjusting scheduling operations based on logging data, according to an example embodiment.

FIG. 10 depicts a system 1000 for adjusting scheduling operations based on the logging data 400, according to an example embodiment. The system includes a scheduling code adjuster 1002, the scheduler 130, and an input/output (I/O) device 108.

The I/O device 108 is accessible by a user 1020 to view the logging data 400. For example, the I/O device 108 can include a graphical user interface that presents the logging data 400 to the user 1020 as a table or pie chart, as illustrated in FIGS. 5-9. The user 1020 can also use the I/O device 108 to provide a user input to initiate tracking of the logging data 400.

The scheduling code adjuster 1002 is also configured to receive the logging data 400. Based on the logging data 400, the scheduling code adjuster 1002 can adjust scheduling code 1006 of the scheduler 130 to increase thread parallelism. According to some implementations, the user 1020 can provide the scheduling code 1006 to the scheduling code adjuster 1002 in response to viewing the logging data 400 to increase thread parallelism. Adjusting the scheduling code 1006 may result in higher percentages of time where multiple classes of threads are running in parallel and lower percentages of time where at least one processing core 110 is idle.

As an alternative to adjusting scheduling code 1006 of the scheduler 130 to increase thread parallelism, the user 1020 can review and re-design thread functionality to increase thread parallelism. In such a case, new logging data 400 can be obtained after running the threads 152 using the re-designed thread functionality.

Figure 11:
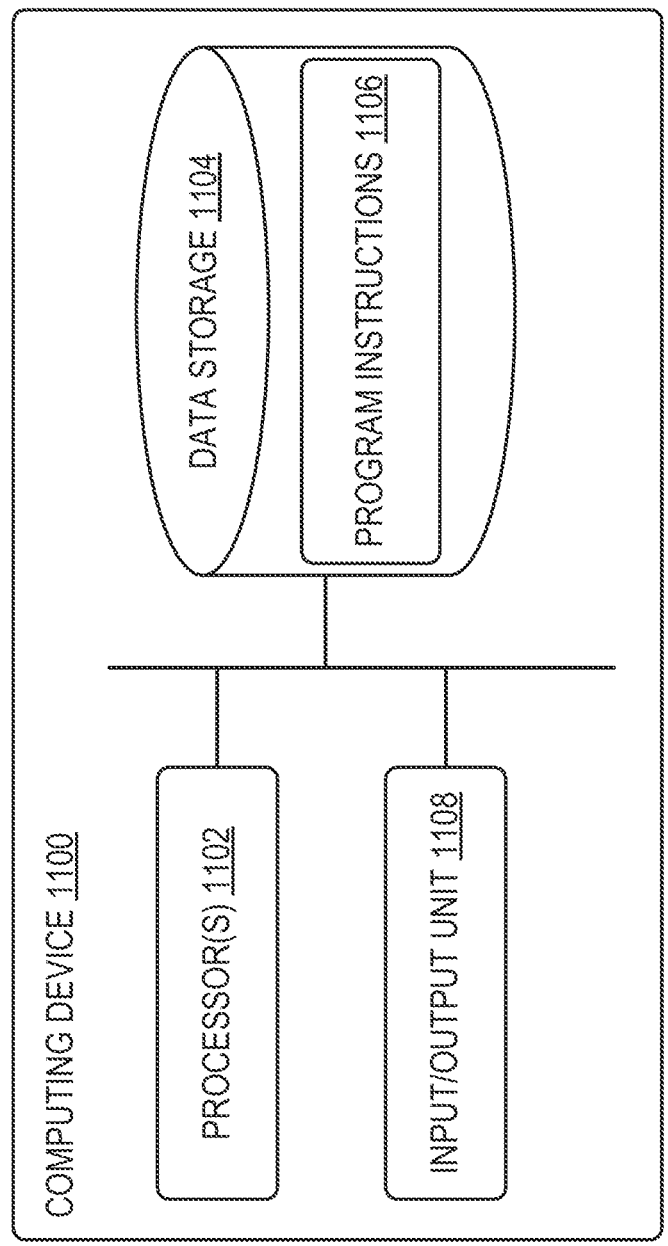
FIG. 11 is a simplified block diagram of a computing device, according to an example embodiment.

FIG. 11 illustrates a simplified block diagram of a computing device 1100, which can be configured to carry out the methods, processes, or functions disclosed in this specification and/or the accompanying drawings. One or more of the components described above, such as the operating system 102, the multicore processor 104, main memory 106, and/or the I/O device 108, can be implemented as, or can be integrated within, the computing device 1100. Generally, the manner in which the computing device 1100 is implemented can vary, depending upon the particular application.

The computing device 1100 can include one or more processors 1102, data storage 1104, program instructions 1106, and an input/output unit 1108, all of which can be coupled by a system bus or a similar mechanism. The one or more processors 1102 can include one or more central processing units (CPUs), such as one or more general purpose processors and/or one or more dedicated processors (e.g., application specific integrated circuits (ASICs) or digital signal processors (DSPs), etc.). The one or more processors 1102 can be configured to execute computer-readable program instructions 1106 that are stored in the data storage 1104 and are executable to provide at least part of the functionality described herein. According to one implementation, the one or more processors 1102 can include the multicore processor 104 and/or the operating system 102. According to one implementation, the data storage 1104 can include the main memory 106 and the program instructions 906 can include the instructions 190. According to one implementation, the I/O device 1108 can include the I/O device 108.

The data storage 1104 can include or take the form of one or more non-transitory, computer-readable storage media that can be read or accessed by at least one of the one or more processors 1102. The non-transitory, computer-readable storage media can include volatile and/or non-volatile storage components, such as optical, magnetic, organic, or other memory or disc storage, which can be integrated in whole or in part with at least one of the one or more processors 1102. In some embodiments, the data storage 1104 can be implemented using a single physical device (e.g., one optical, magnetic, organic, or other memory or disc storage unit), while in other embodiments, the data storage 904 can be implemented using two or more physical devices.

The input/output unit 1108 can include network input/output devices. Network input/output devices can include wired network receivers and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network, and/or wireless network receivers and/or transceivers, such as a Bluetooth transceiver, a Zigbee transceiver, a Wi-Fi transceiver, a WiMAX transceiver, a wireless wide-area network (WWAN) transceiver and/or other similar types of wireless transceivers configurable to communicate via a wireless network.

The input/output unit 1108 can additionally or alternatively include user input/output devices and/or other types of input/output devices. For example, the input/output unit 1108 can include a touch screen, a keyboard, a keypad, a computer mouse, liquid crystal displays (LCD), light emitting diodes (LEDs), displays using digital light processing (DLP) technology, cathode ray tubes (CRT), light bulbs, and/or other similar devices.

Figure 12:
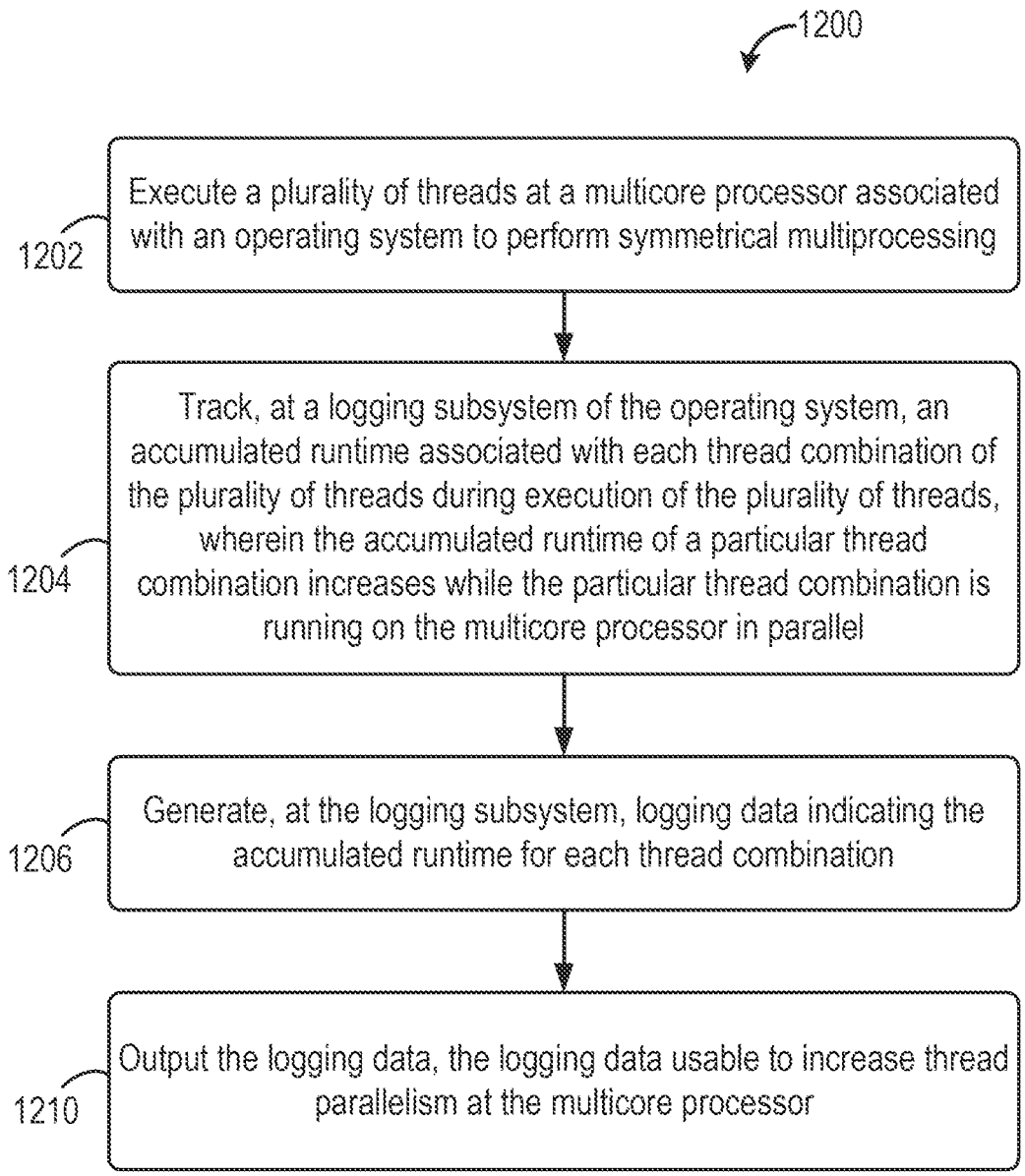
FIG. 12 is a flowchart of a method, according to an example embodiment.

FIG. 12 depicts a flowchart of an example method 1200 that can be carried out in connection with one or more of the systems described herein. The example method 1200 can include one or more operations, functions, or actions, as depicted by one or more of blocks 1202-1208, each of which can be carried out by the systems described by way of FIGS. 1-11; however, other configurations could be used as well.

Furthermore, those skilled in the art will understand that the flowchart described herein illustrates functionality and operation of certain implementations of example embodiments. In this regard, each block of the flowchart can represent a module or a portion of program code, which includes one or more instructions executable by a processor for implementing, managing, or driving specific logical functions or steps in the method 1200. The program code can be stored on any type of computer readable medium, for example, such as a storage device including a disk or hard drive. In addition, each block can represent circuitry that is wired to perform the specific logical functions in the method 1200. Alternative implementations are included within the scope of the example embodiments of the present application in which functions can be executed out of order from that shown or discussed, including substantially concurrent order, depending on the functionality involved, as would be understood by those reasonably skilled in the art.

Referring to FIG. 12, the method 1200 includes executing a plurality of threads at a multicore processor associated with an operating system to perform symmetrical multiprocessing, at 1202. For example, referring to FIG. 1, the processing cores 110 execute the plurality of threads 152 at the multicore processor 104 associated with the operating system 102 to perform symmetrical multiprocessing.

The method 1200 also includes tracking, at a logging subsystem of the operating system, an accumulated runtime associated with each thread combination of the plurality of threads during execution of the plurality of threads, at 1204. The accumulated runtime of a particular thread combination increases while the particular thread combination is running on the multicore processor in parallel. For example, referring to FIG. 1, the logging subsystem 132 tracks the accumulated runtime 180, 182, 184 associated with each thread combination 170, 172, 174 of the plurality of threads 152 during execution of the plurality of threads. The accumulated runtime of a particular thread combination, such as the thread combination 170, increases while the thread combination 170 is running on the multicore processor 104 in parallel. For example, as illustrated with respect to FIG. 3, when the thread combination 170 (e.g., the threads 152A, 152C) are running on the processing cores 110A, 110C, respectively, during the first time stage 310, the accumulation runtime 180 of the thread combination 170 increases. In the illustrative example of FIG. 3, the accumulated runtime 180 increases by 2 milliseconds.

According to one implementation of the method 1200, tracking the accumulated runtime associated with each thread combination includes identifying a first group of threads in the plurality of threads that are assigned to processing cores of the multicore processor during a first time stage. For example, referring to FIGS. 1 and 3, the logging subsystem 132 can identify the first group of threads 152A, 152C in the plurality of threads 152 that are assigned to the processing cores 110A, 110C of the multicore processor 104 during the first time stage 310. Tracking the accumulated runtime can also include assigning the first group of threads to a first accumulation index value. The first accumulation index value corresponds to a first thread combination. For example, referring to FIGS. 1 and 3, the logging subsystem 132 can assign the first group of threads 152A, 152C to the accumulation index value 161 (e.g., "11") which corresponds to the thread combination 170. Tracking the accumulated runtime can also include determining a time duration of the first time stage and logging the time duration of the first time stage under the first accumulation index value to generate first logging data. For example, the logging subsystem 132 can determine the time duration of the first time stage 310 and log the time duration of the first time stage 310 under the accumulation index value 161 to generate the logging data 160.

According to one implementation of the method 1200, tracking the accumulated runtime associated with each thread includes identifying a second group of threads in the plurality of threads that are assigned to processing cores of the multicore processor during a second time stage. For example, referring to FIGS. 1 and 3, the logging subsystem 132 can identify the second group of threads 152A, 152B, 152C in the plurality of threads 152 that are assigned to the processing cores 110A, 110B, 110C of the multicore processor 104 during the second time stage 320. Tracking the accumulated runtime can also include assigning the second group of threads to a second accumulation index value. The second accumulation index value corresponds to a second thread combination. For example, referring to FIGS. 1 and 3, the logging subsystem 132 can assign the second group of threads 152A, 152B, 152C to the accumulation index value 163 (e.g., "15") which corresponds to the thread combination 172. Tracking the accumulated runtime can also include determining a time duration of the second time stage and logging the time duration of the second time stage under the second accumulation index value to generate second logging data. For example, the logging subsystem 132 can determine the time duration of the second time stage 320 and log the time duration of the second time stage 320 under the accumulation index value 163 to generate the logging data 162.

According to one implementation of the method 1200, tracking the accumulated runtime associated with each thread include identifying a third group of threads in the plurality of threads that are assigned to processing cores of the multicore processor during a third time stage and determining whether the third group of threads is identical to the first group of threads. For example, referring to FIGS. 1 and 3, the logging subsystem 132 can identify the third group of threads 152A, 152B, 152C, 152D in the plurality of threads 152 that are associated to the processing cores 110A, 110B, 110C, 110D of the multicore processor during the third time stage 330. As illustrated in FIG. 3, the third group of threads 152A, 152B, 152C, 152D is not identical to the first group of threads 152A, 152C.

In response to determining that the third group of threads is not identical to the first group of threads, the method 1200 can include assigning the third group of threads to a third accumulation index value. The third accumulation index value corresponding to a third thread combination. For example, referring to FIGS. 1 and 3, the logging subsystem 132 can assign the third group of threads 152A, 152B, 152C, 152D to the accumulation index value 167 (e.g., "30") which corresponds to the thread combination 174. The method 1200 can also include determining a time duration of the third time stage and logging the time duration of the third time stage under the third accumulation index value to generate third logging data. For example, referring to FIGS. 1 and 3, the logging subsystem 132 can determine the time duration of the third time stage 330 and log the time duration of the third time stage 330 under the accumulation index value 165 to generate the logging data 164.

However, in response to a determination that the third group of threads is identical to the first group of threads, the method 1200 can include assigning the third group of threads to the first accumulation index value, determining a time duration of the third time stage, and adding the time duration of the third time stage to previously logged time durations under the first accumulation index value to update the first logging data.

The method 1200 includes generating, at the logging subsystem, logging data indicating the accumulated runtime for each thread combination, at 1206. For example, referring to FIGS. 1 and 4, the logging subsystem 132 generates the logging data 400 indicating the accumulated runtime for each thread combination.

The method 1200 also includes outputting the logging data, at 1208. For example, the logging subsystem 132 or the multicore processor 104 can output the logging data 400 to the I/O device 108. The output can reflect one or more of the tables 500-800 in FIGS. 5-8, the chart 900 of FIG. 9, or a combination thereof. The logging data 400 is usable to increase thread parallelism at the multicore processor 104. For example, the scheduling code adjuster 1002 can adjust the scheduling code 1006 to increase parallelism at the multicore processor 104 based on the logging data 400.

The method 1200 enables thread parallelism to be tracked or measured using a reduced amount of memory. For example, because the logging data 400 stores the accumulated runtime for different thread combinations as opposed to storing data intensive information associated with switching between threads and processing cores, the logging data 400 utilizes a small amount of memory compared to traditional data used to track thread parallelism.

III. CONCLUSION

The particular arrangements shown in the Figures should not be viewed as limiting. It should be understood that other embodiments can include more or less of each element shown in a given Figure. Further, some of the illustrated elements can be combined or omitted. Yet further, example embodiments can include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. A method of logging thread parallelism data, the method comprising:
   executing a plurality of threads at a multicore processor associated with an operating system to perform symmetrical multiprocessing;
   tracking, at a logging subsystem of the operating system, an accumulated runtime associated with each thread combination of the plurality of threads during execution of the plurality of threads, wherein the accumulated runtime of a particular thread combination increases while the particular thread combination is running on the multicore processor in parallel, and wherein tracking the accumulated runtime associated with each thread combination comprises:
   identifying a first group of threads in the plurality of threads that are assigned to processing cores of the multicore processor during a first time stage;
   assigning the first group of threads to a first accumulation index value, the first accumulation index value corresponding to a first thread combination;
   determining a time duration of the first time stage; and
   logging the time duration of the first time stage under the first accumulation index value to generate first logging data, the first logging data indicating an accumulated runtime for the first thread combination
   generating, at the logging subsystem, logging data indicating the accumulated runtime for each thread combination; and
   outputting the logging data, the logging data usable to increase thread parallelism at the multicore processor.

2. The method of claim 1, wherein tracking the accumulated runtime associated with each thread combination comprises:
   identifying a second group of threads in the plurality of threads that are assigned to processing cores of the multicore processor during a second time stage;
   assigning the second group of threads to a second accumulation index value, the second accumulation index value corresponding to a second thread combination;
   determining a time duration of the second time stage; and
   logging the time duration of the second time stage under the second accumulation index value to generate second logging data, the second logging data indicating an accumulated runtime for the second thread combination.

3. The method of claim 2, wherein tracking the accumulated runtime associated with each thread combination comprises:
   identifying a third group of threads in the plurality of threads that are assigned to processing cores of the multicore processor during a third time stage; and
   determining whether the third group of threads is identical to the first group of threads.

4. The method of claim 3, wherein, in response to a determination that the third group of threads is identical to the first group of threads, the method comprises:
   assigning the third group of threads to the first accumulation index value;
   determining a time duration of the third time stage; and
   adding the time duration of the third time stage to previously logged time durations under the first accumulation index value to update the first logging data.

5. The method of claim 3, wherein, in response to a determination that the third group of threads is not identical to the first group of threads, the method comprises:
   assigning the third group of threads to a third accumulation index value, the third accumulation index value corresponding to a third thread combination;
   determining a time duration of the third time stage; and
   logging the time duration of the third time stage under the third accumulation index value to generate third logging data, the third logging data indicating an accumulated runtime for the first thread combination.

6. A method of logging thread parallelism data, the method comprising:
   executing a plurality of threads at a multicore processor associated with an operating system to perform symmetrical multiprocessing;
   tracking, at a logging subsystem of the operating system, an accumulated runtime associated with each thread combination of the plurality of threads during execution of the plurality of threads, wherein the accumulated runtime of a particular thread combination increases while the particular thread combination is running on the multicore processor in parallel, and wherein tracking the accumulated runtime associated with each thread combination utilizes a smaller amount of memory than tracking switching between thread combinationsi;
   generating, at the logging subsystem, logging data indicating the accumulated runtime for each thread combination; and
   outputting the logging data, the logging data usable to increase thread parallelism at the multicore processor.

7. The method of claim 6, further comprising adjusting scheduling operations associated with the operating system based on the logging data.

8. The method of claim 6, further comprising receiving a user input to initiate tracking, wherein the accumulated runtime associated with each thread combination is tracked in response to receiving the user input.

9. The method of claim 6, further comprising presenting the logging data at a graphical user interface as a pie chart.

10. The method of claim 6, further comprising presenting the logging data at a graphical user interface as a table.

11. The method of claim 6, wherein the plurality of threads comprises a first thread associated with a first class, a second thread associated with a second class, and a third thread associated with a third class.

12. The method of claim 6, wherein the plurality of threads is associated with a printing process.

13. A system for logging thread parallelism data, the system comprising:
- a multicore processor configured to execute a plurality of threads to perform symmetrical multiprocessing;
- an operating system associated with the multicore processor, the operating system comprising:
  - a logging subsystem configured to:
    - track an accumulated runtime associated with each thread combination of the plurality of threads during execution of the plurality of threads, wherein the accumulated runtime of a particular thread combination increases while the particular thread combination is running on the multicore processor in parallel; and
    - generate logging data indicating the accumulated runtime for each thread combination; and
- an output device configured to output the logging data, the logging data usable to increase thread parallelism at the multicore processor,
wherein, to track the accumulated runtime associated with each thread combination, the logging system is configured to:
- identify a first group of threads in the plurality of threads that are assigned to processing cores of the multicore processor during a first time stage;
- assign the first group of threads to a first accumulation index value, the first accumulation index value corresponding to a first thread combination;
- determine a time duration of the first time stage; and
- log the time duration of the first time stage under the first accumulation index value to generate first logging data, the first logging data indicating an accumulated runtime for the first thread combination.

14. The system of claim 13, wherein, to track the accumulated runtime associated with each thread combination, the logging system is configured to:
- identify a second group of threads in the plurality of threads that are assigned to processing cores of the multicore processor during a second time stage;
- assign the second group of threads to a second accumulation index value, the second accumulation index value corresponding to a second thread combination;
- determine a time duration of the second time stage; and
- log the time duration of the second time stage under the second accumulation index value to generate second logging data, the second logging data indicating an accumulated runtime for the second thread combination.

15. The system of claim 14, wherein, to track the accumulated runtime associated with each thread combination, the logging system is configured to:
- identify a third group of threads in the plurality of threads that are assigned to processing cores of the multicore processor during a third time stage; and
- determine whether the third group of threads is identical to the first group of threads.

16. The system of claim 15, wherein, in response to a determination that the third group of threads is identical to the first group of threads, the logging system is configured to:
- assign the third group of threads to the first accumulation index value;
- determine a time duration of the third time stage; and
- add the time duration of the third time stage to previously logged time durations under the first accumulation index value to update the first logging data.

17. The system of claim 15, wherein, in response to a determination that the third group of threads is not identical to the first group of threads, the logging system is configured to:
- assign the third group of threads to a third accumulation index value, the third accumulation index value corresponding to a third thread combination;
- determine a time duration of the third time stage; and
- log the time duration of the third time stage under the third accumulation index value to generate third logging data, the third logging data indicating an accumulated runtime for the first thread combination.

18. The method of claim 1, further comprising adjusting scheduling operations associated with the operating system based on the logging data.

19. The method of claim 1, further comprising receiving a user input to initiate tracking, wherein the accumulated runtime associated with each thread combination is tracked in response to receiving the user input.

20. The method of claim 1, wherein the plurality of threads is associated with a printing process.

* * * * *